Sept. 17, 1935.   F. J. HINDERLITER   2,014,804
FISHING TOOL
Filed March 4, 1932    2 Sheets-Sheet 1
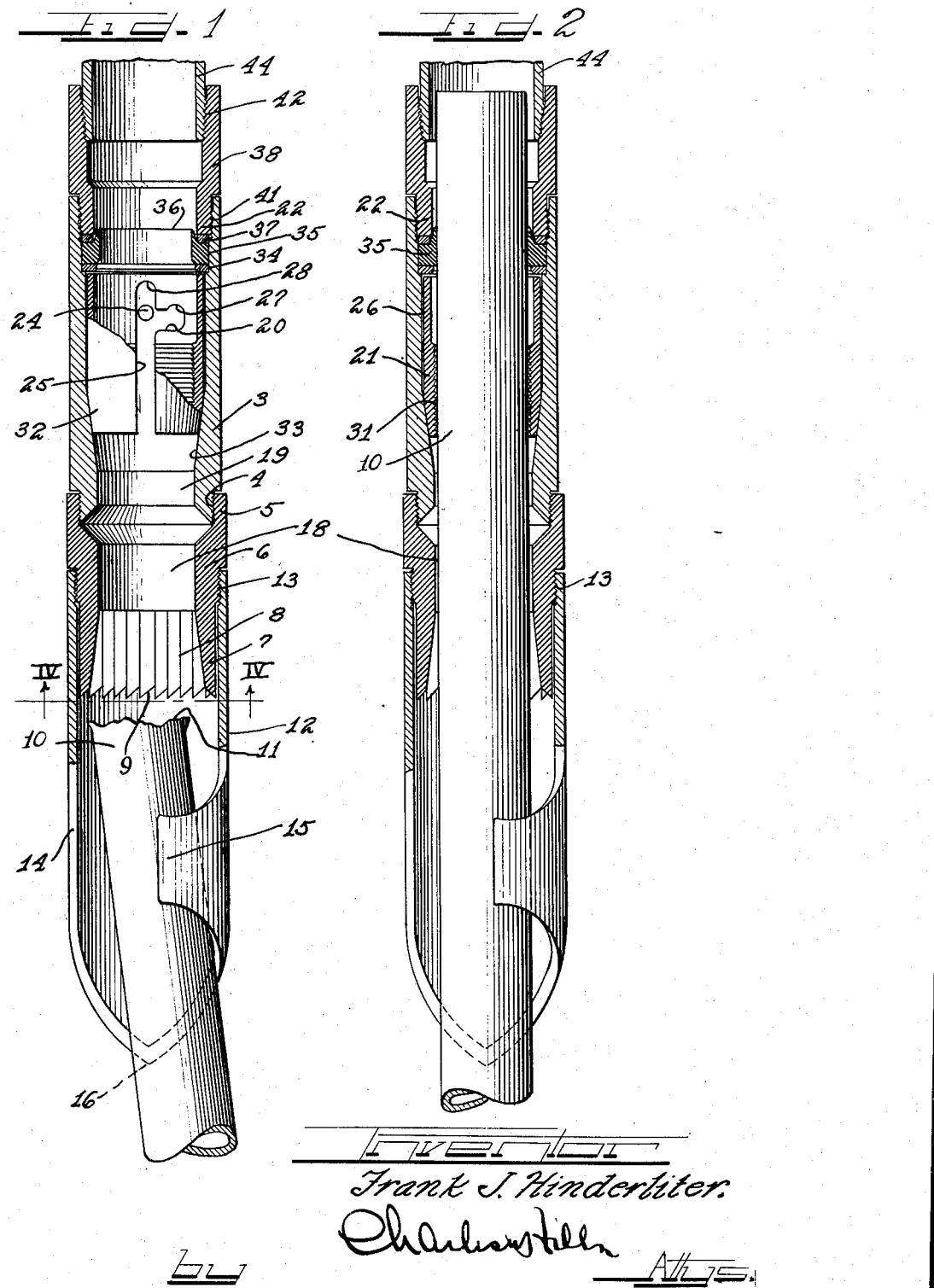
Inventor
Frank J. Hinderliter Sept. 17, 1935. F. J. HINDERLITER 2,014,804
FISHING TOOL
Filed March 4, 1932 2 Sheets-Sheet 2
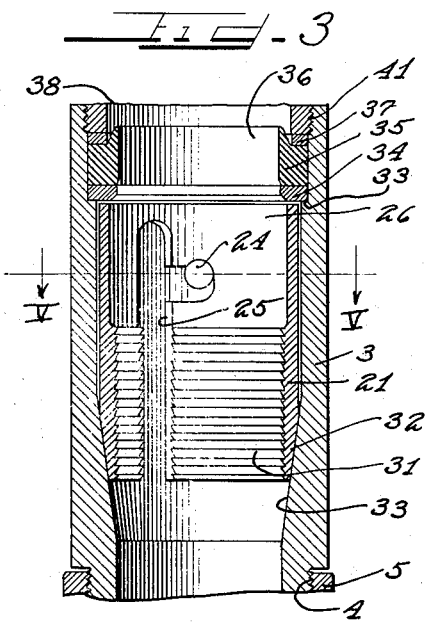
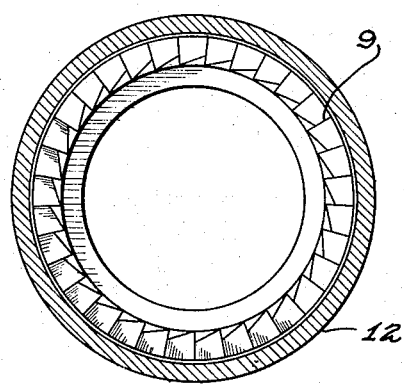
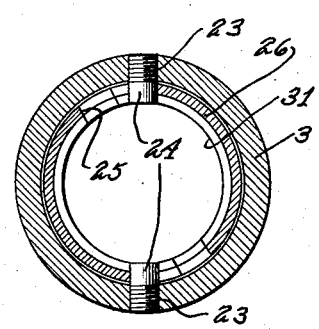
Inventor
Frank J. Hinderliter.

Patented Sept. 17, 1935

2,014,804

UNITED STATES PATENT OFFICE 2,014,804

FISHING TOOL

Frank J. Hinderliter, Tulsa, Okla.

Application March 4, 1932, Serial No. 596,716

1 Claim. (Cl. 294—86)

This invention relates to fishing tools and will be described as embodied in an improved tool adapted for removing objects from a deep well such as a broken drill bit, drill pipe or the like.

An object of the present invention is the provision of an improved fishing tool of the kind identified which is adapted to smooth the upper end of a pipe which has been twisted off in a well, so that the pipe may pass through the body of the fishing tool.

Another object of the invention is the provision of a fishing tool having means for locating a broken pipe or the like and guiding it into the mouth of a cutting or milling device and through the body of the fishing tool, and the provision of clutch means within the body for engaging and gripping the pipe to lift the same out of the well.

A further object is the provision of such a tool incorporating means for forming a seal between the pipe and the body of the fishing tool when the pipe is positioned therein in such a manner that water or the like may be circulated through the pipe without loss of pressure, for facilitating the removal of earth which may have fallen into the well, so that the drill pipe may be loosened and more readily removed.

A further object is the provision of such a tool embodying a clutch element which may be caused to engage the drill pipe for lifting the same, and which may also be actuated in a manner to release the pipe and permit the withdrawal of the fishing tool in case the drill pipe cannot be lifted.

Other objects and advantages of this invention will become apparent from the following detail description with reference to the accompanying drawings in which:

Figure 1 is a longitudinal section taken on substantially the vertical axis of a fishing tool incorporating my invention and showing the same in the process of engaging a drill pipe to be lifted from a well;

Figure 2 is a view similar to Figure 1 but showing the drill pipe extending through the body of the tool and being engaged by the sealing member and the clutch member as when the pipe is about to be lifted;

Figure 3 is an enlarged fragmentary section showing the clutch or slip member, also the sealing means more in detail;

Figure 4 is a horizontal sectional view taken on the line IV—IV of Figure 1; and Figure 5 is a cross-sectional view taken on the line V—V of Figure 3.

The improved fishing tool as herein disclosed comprises a body portion or bowl 3 having external threads 4 near the lower end which are engaged by the internal threads on the upper extension 5 of the vertical mill 6. The mill 6 is provided with teeth 7 having cutting portions 8 on the inner side and cutting portions 9 on the bottom adapted to engage the upper end of a drill pipe or the like 10 which may have been twisted off and as a result presents a very rough upper edge 11 which may not pass through the body of the tool because of the outwardly extending portions. The pipe must first be trimmed before it will pass through the body of the tool and it is for this purpose that the vertical mill is provided on the lower end of the body.

In order that the pipe may be effectively engaged by the mill, and in order that the mill may be protected from the sides of the well, a guide pipe 12 is provided which has threaded engagement with the mill at 13 on the outside of the mill and substantially midway between the ends thereof. The lower portion of the guide pipe 12 has a cutout portion 14 of such shape that a hook 15 extends circumferentially and is adapted to engage and pass around the drill pipe for directing the same into the mouth of the vertical mill. The lower end of the guide pipe is tapered to a point at 16 and the inner edge is beveled upwardly and inwardly to facilitate the hook in passing around and picking up the end of the pipe.

The smallest diameter of the cutting portion of the mill 6 is substantially the same as the smallest diameter of the shank of the mill at 18 and the smallest diameter of the body 3 at 19 so that when the end of the pipe passes through the mill it is properly trimmed to a size which will pass through the body of the tool and through the wedge-like collar or clutch 21 and through the rubber seal or packing ring 35 into the position shown in Figure 2.

Within the body 3 are fixed, as by threaded engagement therewith at 23, oppositely disposed pins 24 which extend inwardly a short distance. The pins 24 pass into a bayonet slot 25 in the shank 26 of the clutch 21 and are adapted to support the clutch in either of two adjusted positions by engaging the upper portion of the slot at 27 and 28 selectively.

The upper portion or shank 26 of the clutch is slightly smaller than the internal diameter of the body at the central portion thereof such that the clutch fits loosely within the body. The lower portion of the clutch is provided with internal teeth 31 adapted to engage the pipe as shown in Figure 2. The outer side of the lower end of the clutch is beveled inwardly to form a cam face 32 which engages the upper portion of the cam face 33 on the inside of the body and by which the teeth of the clutch are forced inwardly when the clutch is caused to move downwardly relative to the body by reason of frictional engagement with the pipe 10.

At a point slightly above the normal position of the clutch, the body is provided with an internal shoulder 33 on which is seated a metal ring 34. The lower inner edge of the metal ring 34 is beveled to facilitate the entrance of the pipe thereinto. An annular packing of rubber or the like 35 having an inwardly and upwardly extending lip 36 is interposed between the metal rings 34 and 37 and held in place as a unit by the lower end 22 of the cylindrical member 38 which has external threads thereon having engagement with the internal threads 41 on the upper extension of the body 3. The upper portion of the cylindrical member 38 has internal threads 42 engaging the external threads on the lower end of the supporting and actuating pipe 44.

In the operation of this invention the tool is lowered into a well containing a drill pipe or the like which may have been twisted off during operation. When reaching the approximate depth of the pipe to be lifted, the tool is rotated and lowered slowly permitting the hook 15 to pass around the upper end of the pipe and direct it to the teeth of the vertical mill 6. The teeth of the mill, upon engaging the upper end of the pipe, trim off the jagged edges and permit the pipe to pass through the body of the tool and through the clutch which, when moved to the position shown in Figure 1, spreads sufficiently to permit the pipe to pass therethrough. The upper end of the pipe then passes vertically through the rubber seal 35 without damaging the seal and to substantially the position shown in Figure 2. Upon attempting to lift the pipe 10 by lifting the tool, the clutch, by reason of frictional engagement with the outside of the pipe, is caused to move downwardly relative to the body 3 and is forced inwardly by the internal cam surface 33 so that the clutch member grips the pipe firmly. When in lifting position, the clutch has lowered relative to the body sufficiently that the oppositely disposed pins 24 may engage the upper end 28 of the bayonet slot 25 for directly supporting the weight of the pipe and avoiding excess outward force on the cam surfaces 33.

After the clutch is in lifting position as shown in Figure 2, it may be still impossible to lift the pipe because of cave-ins near the bottom of the well and in such case water or the like may be forced downwardly through the lifting pipe 44 and through the pipe 10 for clearing out the well and loosening the pipe 10 so that it may be lifted. When water is forced through the pipe 44 into the tool, the packing ring 35, by reason of its upwardly extending lip 36 is pressed firmly against the pipe and prevents the leakage of water and consequent loss of pressure.

In case it is found to be impossible to raise the pipe after it has been firmly secured in the position shown in Figure 2 and after the clutch has firmly engaged the sides of the pipe, the clutch may be released from the pipe by slightly lowering the tool relative to the pipe to lift the clutch member a short distance until the pins 24 come opposite the side slots 20. When in this position, the tool is rotated sufficiently to move the pins 24 into engagement with the portions 27 of the side slots. With the parts in this position, as illustrated in Figure 3, the tool may be lifted because the pins 24 lift on the clutch with the clutch in a position relative to the body such that the lower ends may expand and release the pipe.

Although only one preferred form of this invention has been described herein, it will be appreciated by those skilled in the art that it is susceptible of various modifications without departing from the principle of the invention, and there is no intention of limiting the invention except as required by the prior art.

I claim as my invention:

In a fishing tool, a tubular body, means associated with said body for gripping a tubular object to be upwardly pulled from the well by said tool, and sealing means above said gripping means for forming a seal about the said object so that fluid will be passed downwardly through said object rather than downwardly around it at the same time that an upward pulling force is being exerted upon said object by said tool, said sealing means including a packing ring having a portion arranged to be forced inwardly into sealing engagement with the outer surface of said object by the pressure of the downwardly flowing fluid said portion being in the form of a laterally extending lip having its inner surface in sealing engagement with the outer surface of the object, and metal rings on opposite sides of said packing ring, said lip projecting inwardly beyond the part of the packing ring between said metal rings.

FRANK J. HINDERLITER.